(12) United States Patent
Cui et al.

(10) Patent No.: US 9,408,221 B2
(45) Date of Patent: Aug. 2, 2016

(54) METHODS AND APPARATUS FOR DETERMINING HOW TO PERFORM OPERATIONS AFTER COMMUNICATION SUSPEND BASED ON INFORMATION BEFORE THE SUSPEND

(71) Applicant: QUALCOMM Incorporated, San Diego, CA (US)

(72) Inventors: Shengshan Cui, San Diego, CA (US); Brandon Allen Burdge, San Diego, CA (US); Shivratna Giri Srinivasan, San Diego, CA (US); Brian Clarke Banister, San Diego, CA (US); Supratik Bhattacharjee, San Diego, CA (US); Raghu Narayan Challa, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 272 days.

(21) Appl. No.: 13/786,907

(22) Filed: Mar. 6, 2013

(65) Prior Publication Data

US 2013/0272218 A1 Oct. 17, 2013

Related U.S. Application Data

(60) Provisional application No. 61/624,187, filed on Apr. 13, 2012.

(51) Int. Cl.
*H04W 72/08* (2009.01)
*H04L 1/00* (2006.01)
(Continued)

(52) U.S. Cl.
CPC .............. *H04W 72/08* (2013.01); *H04L 1/0025* (2013.01); *H04L 1/0027* (2013.01);
(Continued)

(58) Field of Classification Search
CPC ...................................................... H04W 36/14
USPC ........... 370/329, 252, 331, 332, 335; 455/436
See application file for complete search history.

(56) References Cited

U.S. PATENT DOCUMENTS

2004/0022213 A1* 2/2004 Choi et al. ................... 370/332
2005/0220052 A1* 10/2005 Uehara et al. ................ 370/331
(Continued)

FOREIGN PATENT DOCUMENTS

EP 1569492 A2 8/2005
EP 1761097 A2 3/2007
(Continued)

OTHER PUBLICATIONS

International Search Report and Written Opinion—PCT/US2013/029522—ISA/EPO—Oct. 16, 2013.
(Continued)

*Primary Examiner* — Albert T Chou
(74) *Attorney, Agent, or Firm* — Patterson & Sheridan, LLP

(57) ABSTRACT

Certain aspects of the present disclosure relate to methods and apparatus for Channel Quality Indicator (CQI) reporting after resumption of Long Term Evolution (LTE) after a temporary suspension. In certain aspects, in order to minimize performance penalty to LTE on resumption after an LTE tune away for example to service a different Radio Access Technology, information available from before the LTE tune away may be used in addition to one or more additional parameters for determining how to perform LTE CQI calculation/update after tuning back to LTE. In certain aspects, a decision regarding whether a User Equipment (UE) reports a CQI based on channel conditions before the LTE tune away or reports a CQI based on channel conditions after tuning back to LTE may be based on a value of the Doppler estimate, a time duration of the LTE tune away, or a combination thereof.

52 Claims, 12 Drawing Sheets

(51) Int. Cl.
*H04W 24/10* (2009.01)
*H04W 36/14* (2009.01)
*H04L 1/18* (2006.01)
*H04B 17/309* (2015.01)
*H04B 17/382* (2015.01)

(52) U.S. Cl.
CPC ............ *H04B 17/309* (2015.01); *H04B 17/382* (2015.01); *H04L 1/1812* (2013.01); *H04W 24/10* (2013.01); *H04W 36/14* (2013.01)

(56) References Cited

U.S. PATENT DOCUMENTS

| | | | |
|---|---|---|---|
| 2007/0097914 A1* | 5/2007 | Grilli et al. | 370/329 |
| 2008/0020769 A1* | 1/2008 | Parekh et al. | 455/436 |
| 2008/0274742 A1 | 11/2008 | Bi | |
| 2009/0010319 A1 | 1/2009 | Sun et al. | |
| 2009/0135787 A1* | 5/2009 | Uemura et al. | 370/335 |
| 2009/0280812 A1 | 11/2009 | Cheng et al. | |
| 2010/0202307 A1 | 8/2010 | Lee et al. | |
| 2012/0270545 A1* | 10/2012 | Zhao et al. | 455/435.1 |
| 2012/0281563 A1 | 11/2012 | Comsa et al. | |
| 2012/0314588 A1* | 12/2012 | Nammi | 370/252 |
| 2013/0201890 A1* | 8/2013 | Swaminathan et al. | 370/311 |
| 2013/0215869 A1* | 8/2013 | Srinivasan et al. | 370/331 |

FOREIGN PATENT DOCUMENTS

| | | |
|---|---|---|
| EP | 1928095 A2 | 6/2008 |
| EP | 1986349 A1 | 10/2008 |
| EP | 2020822 A1 | 2/2009 |
| EP | 2020823 A1 | 2/2009 |
| EP | 2242301 A1 | 10/2010 |

OTHER PUBLICATIONS

Lott M., et al., "Interworking of WLAN and 3G systems—WLAN systems and interworking", IEE Proceedings: Communications, Institution of Electrical Engineers, GB, vol. 151, No. 5, Jul. 9, 2004, pp. 507-513, XP006022617, ISSN: 1350-2425, DOI: 10.1049/IP-COM:20040600 the whole document.
Partial International Search Report—PCT/US2013/029522—ISA/EPO—Jul. 24, 2013.
European Search Report—EP15176037—Search Authority—Berlin—Oct. 7, 2015.

* cited by examiner

US 9,408,221 B2

METHODS AND APPARATUS FOR DETERMINING HOW TO PERFORM OPERATIONS AFTER COMMUNICATION SUSPEND BASED ON INFORMATION BEFORE THE SUSPEND

CLAIM OF PRIORITY UNDER 35 U.S.C. §119

The present Application for Patent claims priority to U.S. Provisional Application No. 61/624,187, entitled "METHODS AND APPARATUS FOR DETERMINING HOW TO PERFORM OPERATIONS AFTER COMMUNICATION SUSPEND BASED ON INFORMATION BEFORE SUSPEND," filed Apr. 13, 2012, and assigned to the assignee hereof and hereby expressly incorporated by reference herein.

BACKGROUND

1. Field

The present disclosure relates generally to communication systems, and more particularly, to a method and apparatus for determining how to perform operations after communication suspend based on information before the suspend.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment. The method generally includes suspending communication in a first radio access technology (RAT) to access a second RAT, and determining, based on a Doppler estimate from before suspending the communication, whether to report a Channel Quality Indicator (CQI) based on channel conditions before the suspension of the first RAT or to report the CQI based on channel conditions after resuming the communication in the first RAT.

Certain aspects of the present disclosure provide an apparatus for wireless communication. The apparatus generally includes means for suspending communication in a first radio access technology (RAT) to access a second RAT, and means for determining, based on a Doppler estimate from before suspending the communication, whether to report a Channel Quality Indicator (CQI) based on channel conditions before the suspension of the first RAT or to report the CQI based on channel conditions after resuming the communication in the first RAT.

Certain aspects of the present disclosure include an apparatus for wireless communication. The apparatus generally includes at least one processor and a memory coupled to the at least one processor. The at least one processor is generally configured to suspend communication in a first radio access technology (RAT) to access a second RAT, and determine, based on a Doppler estimate from before suspending the communication, whether to report a Channel Quality Indicator (CQI) based on channel conditions before the suspension of the first RAT or to report the CQI based on channel conditions after resuming the communication in the first RAT.

Certain aspects of the present disclosure include a computer program product for wireless communications. The computer program product generally includes a computer-readable medium including code for suspending communication in a first radio access technology (RAT) to access a second RAT, and determining, based on a Doppler estimate from before suspending the communication, whether to report a Channel Quality Indicator (CQI) based on channel conditions before the suspension of the first RAT or to report the CQI based on channel conditions after resuming the communication in the first RAT.

Certain aspects of the present disclosure provide a method for wireless communications by a user equipment. The method generally includes suspending communication in a first radio access technology (RAT) to access a second RAT, and determining, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

Certain aspects of the present disclosure provide an apparatus for wireless communication. The apparatus generally includes means for suspending communication in a first radio access technology (RAT) to access a second RAT, and means for determining, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

Certain aspects of the present disclosure include an apparatus for wireless communication. The apparatus generally includes at least one processor and a memory coupled to the at least one processor. The at least one processor is generally configured to suspend communication in a first radio access technology (RAT) to access a second RAT, and determine, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

Certain aspects of the present disclosure include a computer program product for wireless communications. The computer program product generally includes a computer-readable medium including code for suspending communication in a first radio access technology (RAT) to access a second RAT, and determining, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

DETAILED DESCRIPTION

Figure 1:
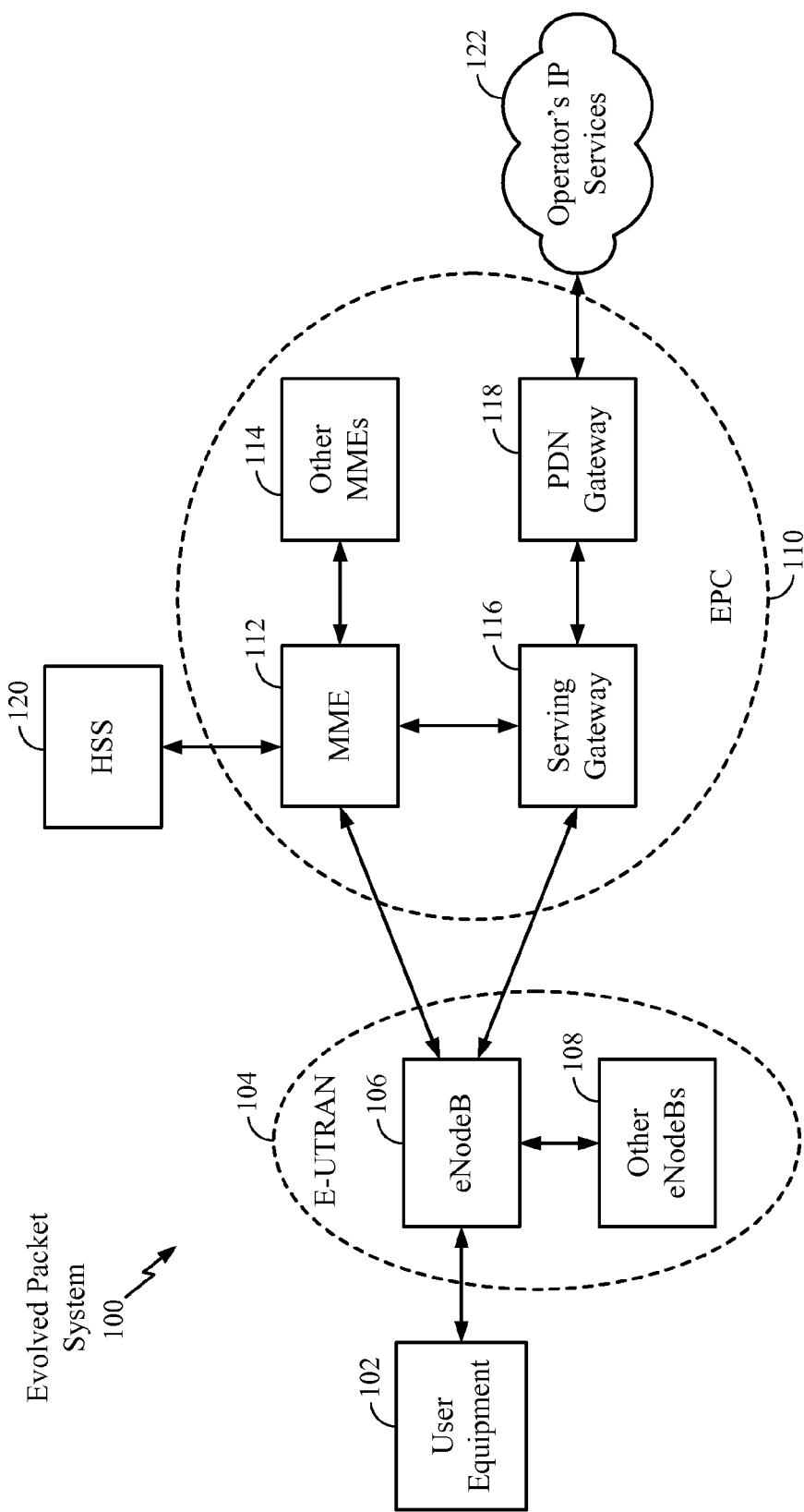
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS Streaming Service (PSS). In this manner, the UE 102 may be coupled to the PDN through the LTE network.

Figure 2:
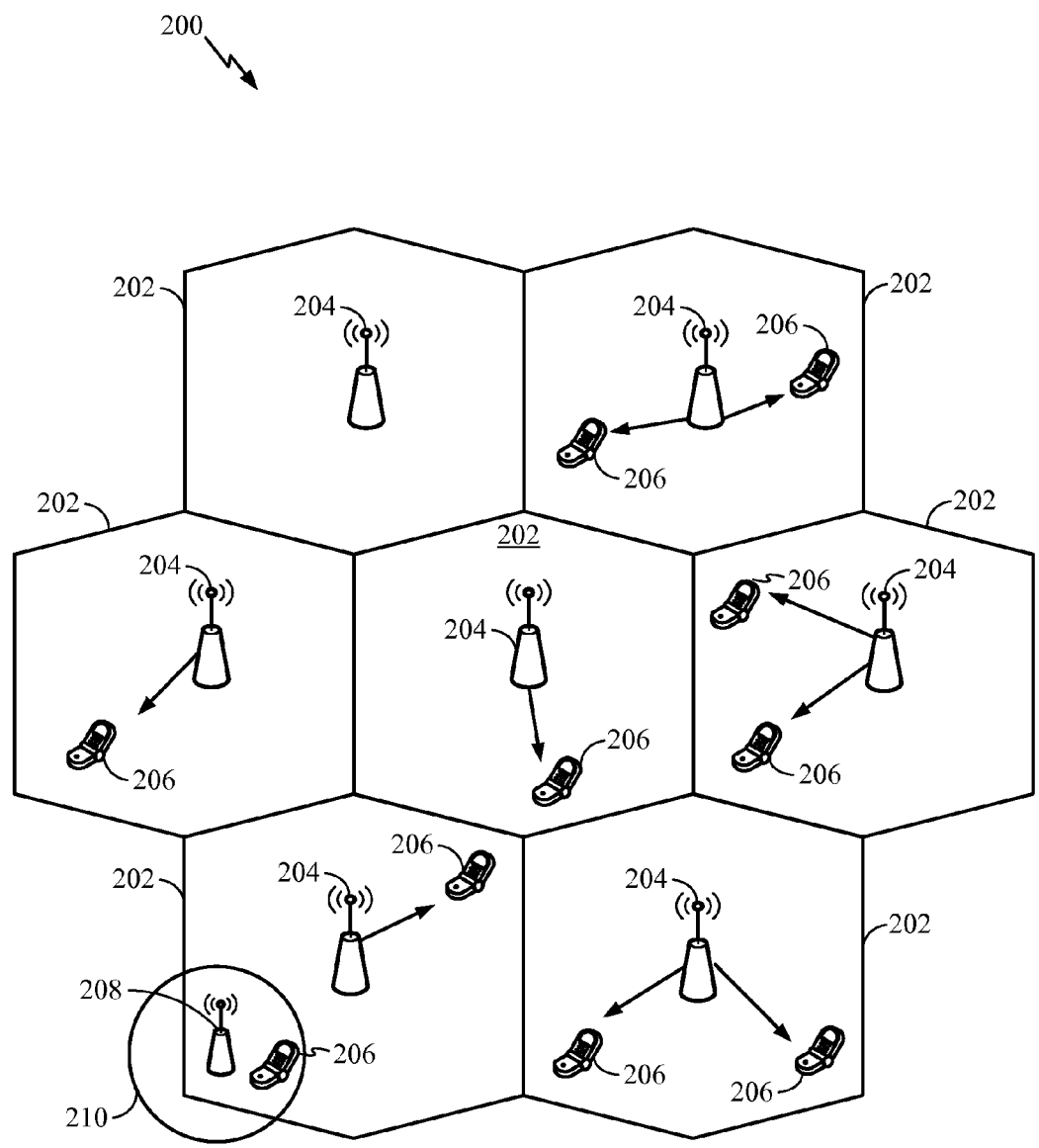
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
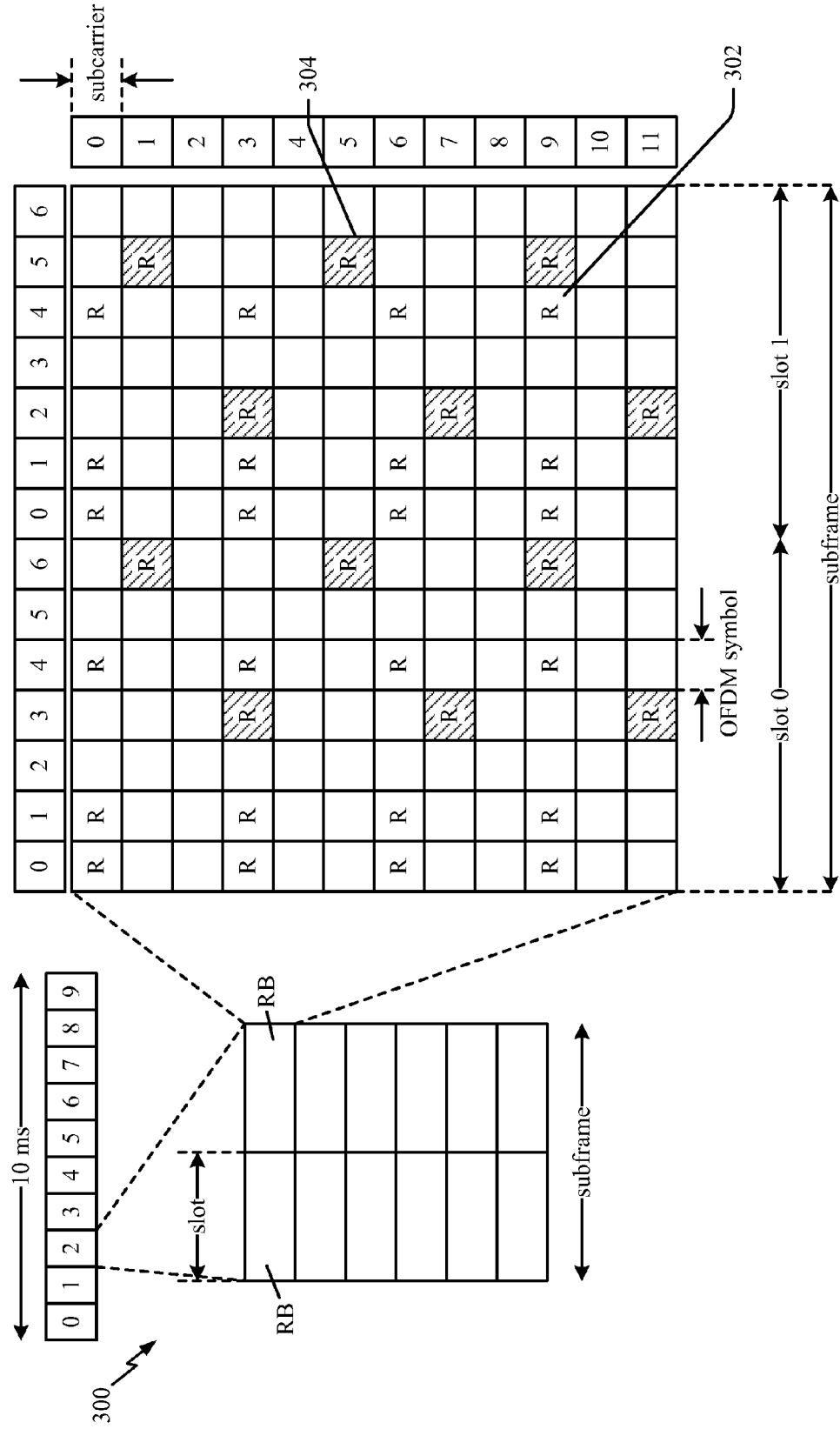
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PD-SCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
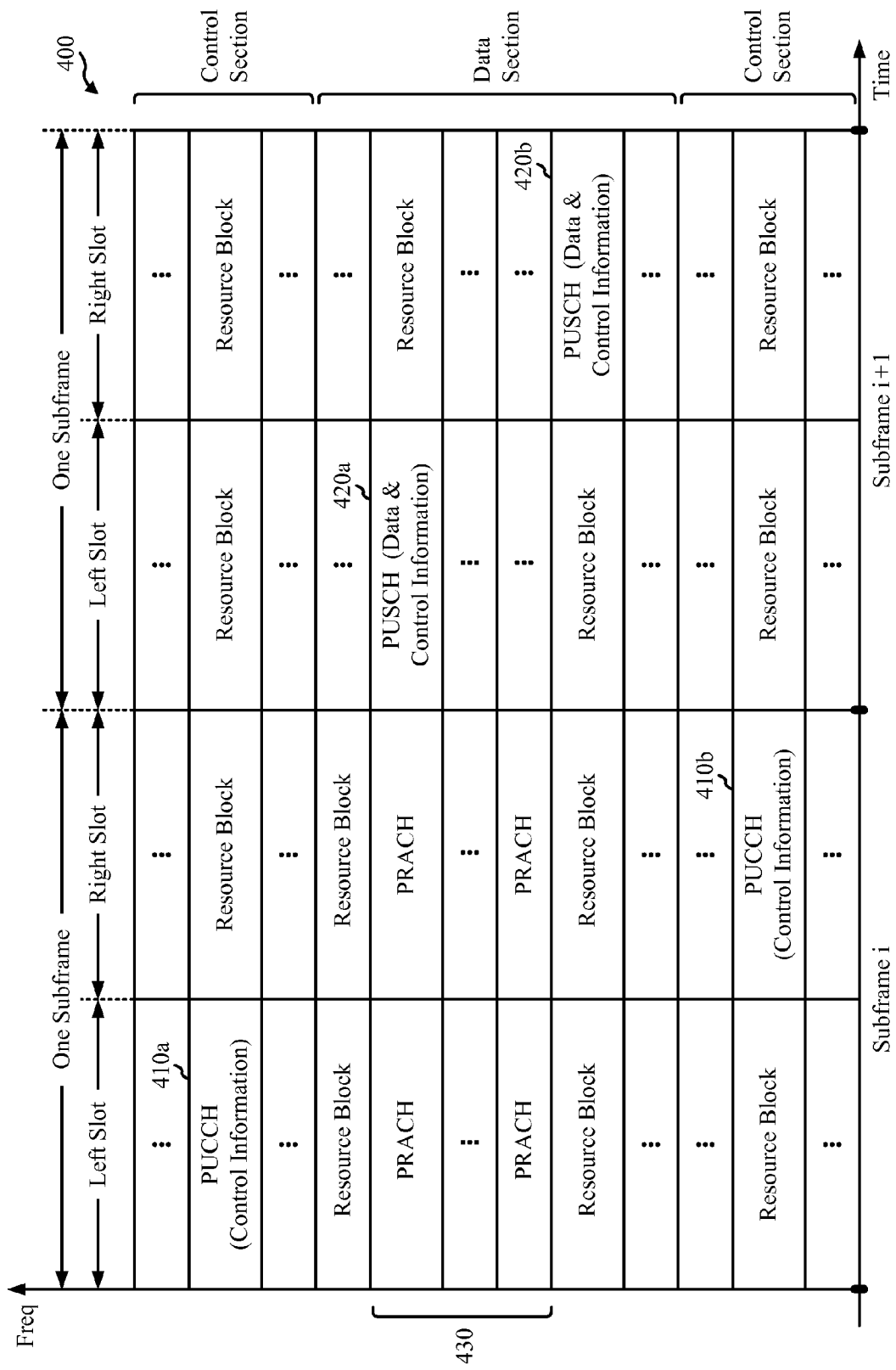
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
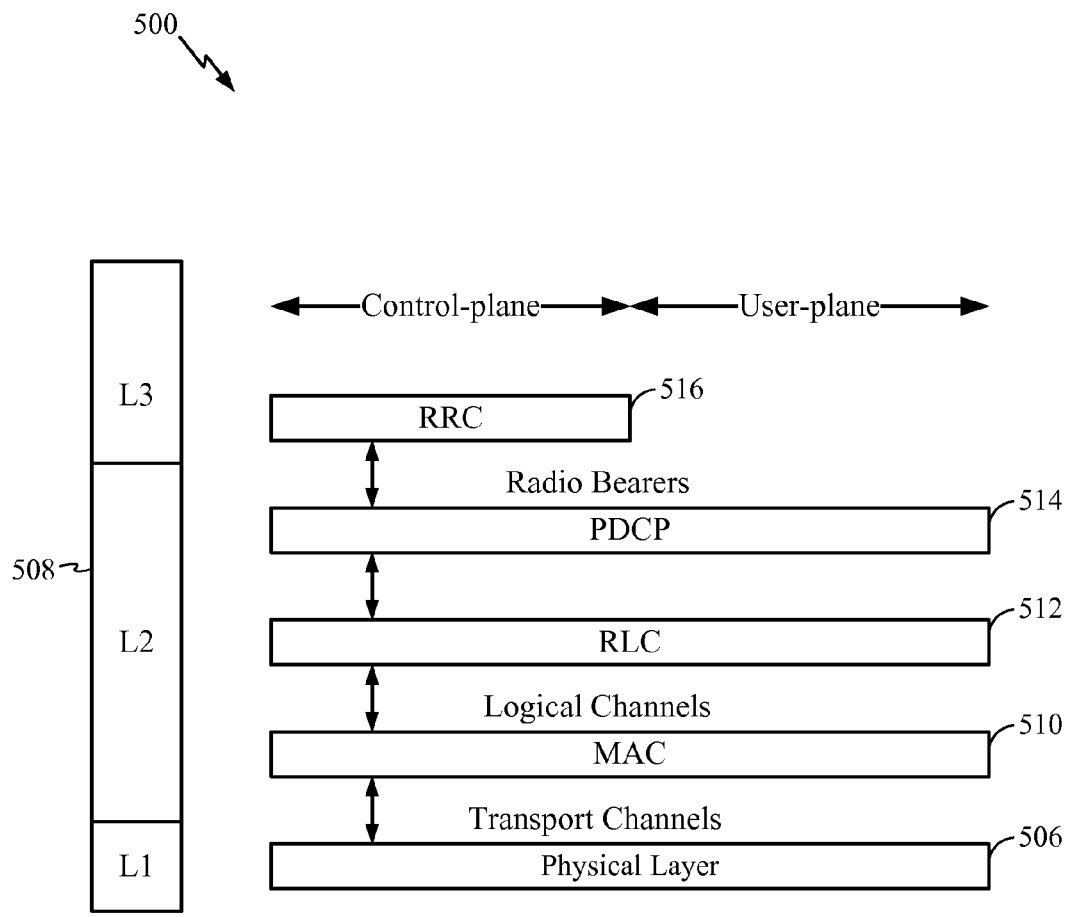
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
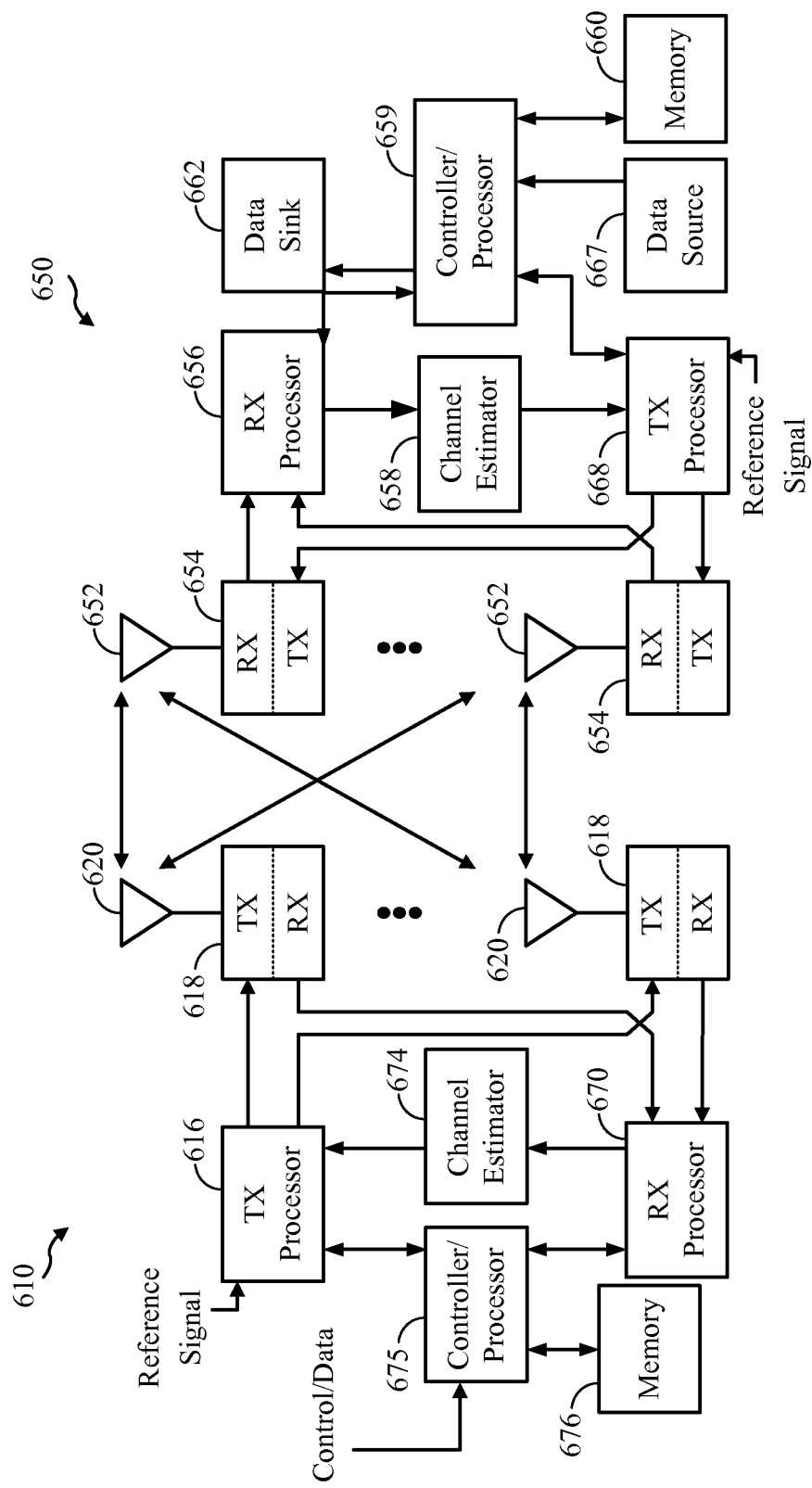
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
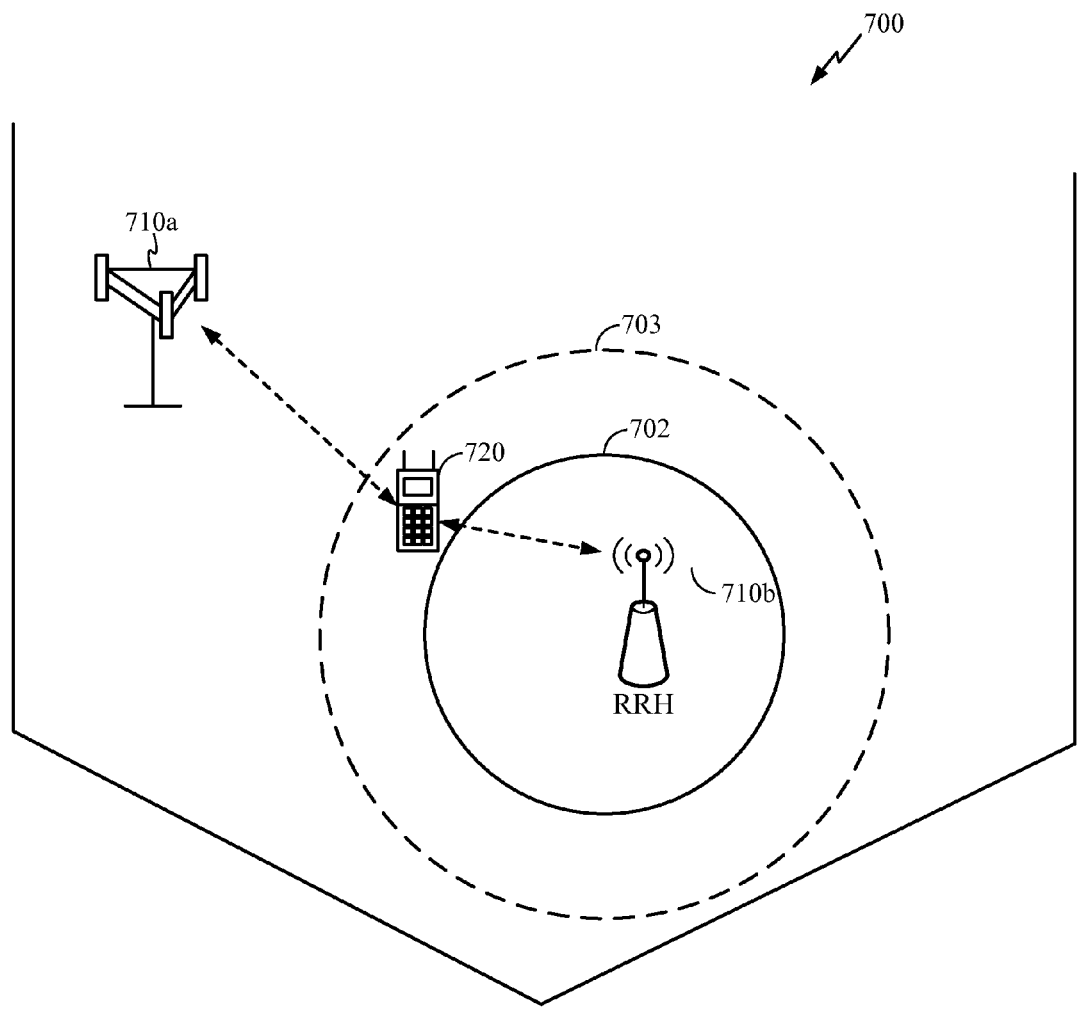
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Example CQI Calculation/Update in Suspended LTE

In networks that support both LTE and CDMA, it may be necessary for the UE chipset to support both LTE and CDMA 1x. There may be two system architectures to support monitoring 1x while operating in LTE. The first architecture may have two separate radio frequency (RF) chains, one for LTE and the other for 1x. This architecture may allow for 1x voice pages to be decoded in parallel when LTE data calls are active. This architecture/algorithm is generally referred to as SVLTE (simultaneous voice and LTE). The MSM8960™ chipset from Qualcomm™ uses this architecture.

Another architecture may have just one RF chain. This RF chain may have to be shared between LTE and 1x, with a constraint that LTE and CDMA technologies may not be active simultaneously. In order to monitor 1x paging, the UE may have to periodically tune away from LTE while an LTE data call is active. This architecture/algorithm is generally referred to as SLTE (suspended LTE). The MSM9x15 chipset from Qualcomm™ uses this architecture.

While the SLTE architecture improves battery consumption, saves board area and bill of material (BOM), a problem may arise when the UE has to periodically monitor 1x voice pages while an LTE data call is active. During the RF-tune time to 1x, the LTE call is suspended or virtually suspended, and this may lead to disruption in LTE UE function that may not be expected by the network. Channel Quality Indicator (CQI) is information that is signaled by a UE to a base station to indicate a suitable data rate (typically a Modulation and Coding Scheme (MCS) value) for downlink transmissions, usually based on a measurement of the received downlink Signal to Interference plus Noise Ratio (SINR). In current SLTE algorithms, when the UE returns to LTE, for example after a temporary suspension of the LTE, a CQI filter state from before the LTE tune away is used by default without considering factors like Doppler (how fast the UE is moving) and time duration of LTE suspension. This may have adverse impacts on LTE call resumption.

In certain aspects, in order to minimize the performance penalty to the LTE call on resumption, information available from before the LTE tune away (e.g., LTE suspension) may be used in addition to one or more additional parameters for determining how to perform LTE CQI calculation/update after tuning back to LTE. In certain aspects, the UE may use information regarding Doppler estimate (from before LTE tune away) and/or suspended time (e.g., the time duration of LTE suspension) to determine if the UE should use its CQI filter state from before the LTE tune away (e.g., resume using such previous CQI filter state) or use a new CQI filter state after tuning back in to LTE (e.g., reset its CQI filter state). Resuming the CQI filter state may include the UE using the same CQI filter state at LTE tune away. In an aspect, when the CQI filter state is resumed, update parameters (e.g., filter time constant) remain the same as before the LTE tune away. In certain aspects, resetting the CQI filter state may include the UE clearing the CQI filter state that was used before LTE suspension and determining a fresh CQI after resuming the LTE connection.

In certain aspects, a decision regarding whether the UE reports a CQI based on channel conditions before the LTE suspension (e.g., resumes CQI filter state) or reports a CQI based on channel conditions after tuning back to LTE may be based on a value of the Doppler estimate, a time duration of LTE tune away, or a combination thereof. In certain aspects, one or more threshold values may be defined for the Doppler estimate and/or the time duration of LTE tune away. For example, a lower threshold for the Doppler estimate ($TH_{Doppler\_LOW}$) and an upper threshold for the Doppler estimate ($TH_{Doppler\_HIGH}$) may be defined. Further, a lower threshold for the suspension time ($Th_{ST\_Low}$), a middle threshold for the suspension time ($Th_{ST\_MID}$) and an upper threshold for the suspension time ($Th_{ST\_HIGH}$) may be defined. The UE behavior regarding CQI calculation/update after LTE resumption may be based on whether a Doppler estimate threshold and/or suspension time threshold is met.

Table-1 shows exemplary UE behavior regarding CQI calculation/update after LTE resumption.

TABLE 1

| CQI behavior after LTE resumption | Suspended duration ≤ $Th_{ST\_LOW}$ | $Th_{ST\,LOW}<$ Suspended duration ≤ $Th_{ST\_MID}$ | $Th_{ST\,MID}<$ Suspended duration < $Th_{ST\_HIGH}$ | Suspended duration ≥ $Th_{ST\_HIGH}$ |
|---|---|---|---|---|
| Doppler ≤ $Th_{Doppler\_LOW}$ | Reset | Reset | Reset | Reset |
| $Th_{Doppler\_LOW}<$ Doppler $<Th_{Doppler\_HIGH}$ | Reset/Resume | Reset/Resume | Reset/Resume | Reset/Resume |
| Doppler ≥ $Th_{Doppler\_HIGH}$ | Resume | Resume | Resume | Reset |

As may be seen from the first row of Table-1, if the Doppler estimate is less than or equals a lower threshold for the Doppler estimate ($TH_{Doppler\_LOW}$), the UE resets the CQI filter state after tuning back to LTE (e.g., irrespective of the value of the time duration of LTE tune away). This is because when Doppler is small, the CQI calculation must be reset to capture the short-term channel fading.

Figure 8:
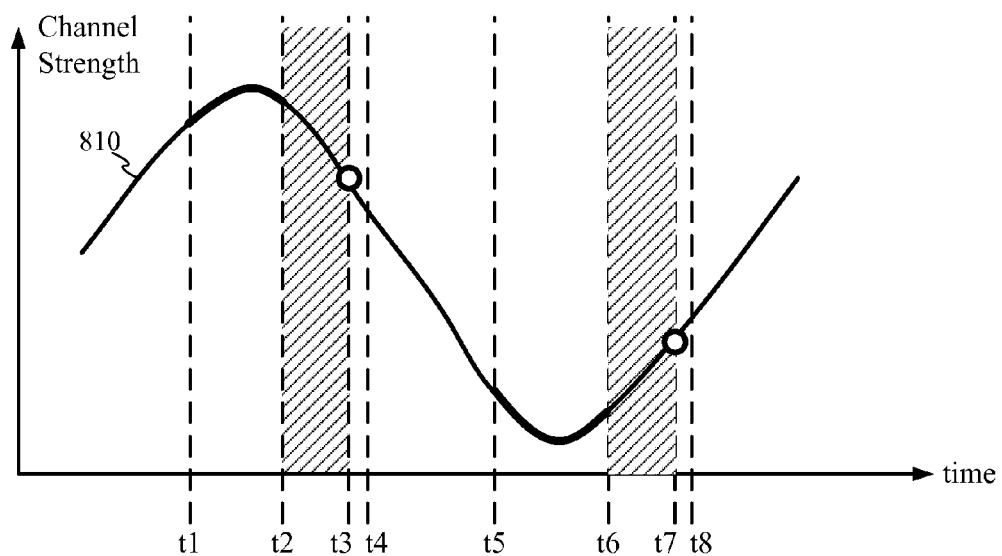
FIG. 8 illustrates channel strength (or SINR) for a low Doppler case in accordance with certain aspects of the disclosure.

FIG. 8 illustrates channel strength (e.g., SINR) for a low Doppler case in accordance with certain aspects of the disclosure. In FIG. 8, the y-axis represents channel strength (e.g., SINR) and the x-axis represents time. The sinusoidal curve 810 represents channel fading over time. The shaded regions between time instants t2-t3 and t6-t7 represent time durations when UE is tuned away from LTE. The non-shaded regions represent time durations when the UE is tuned into LTE.

In the first occasion of LTE tune away (or suspension) between t2 and t3, it may be seen that the instantaneous channel state (denoted by the dot at t3) after the UE tunes back into LTE reflects the channel state more reliably than the average channel state (the average of the curve between t1 and t2) before the LTE tune away. Same observation applies to the second occasion of LTE tune away between t6 and t7 as well.

In certain aspects, in LTE operation, UE reports the calculated CQI value to eNB and the eNB schedules downlink transmission to the UE (e.g., 8 ms later). Referring to FIG. 8, if CQI is reported at t3, eNB may schedule downlink transmission at t4 (e.g., 8 ms later). Since Doppler is low, the channel may remain unchanged and therefore the reported CQI is still a good approximation of the true channel state upon downlink scheduling. In contrast, a CQI based on the average of the curve between t1 and t2 may represent stale data at t3. This applies to the first row of Table 1.

Figure 9:
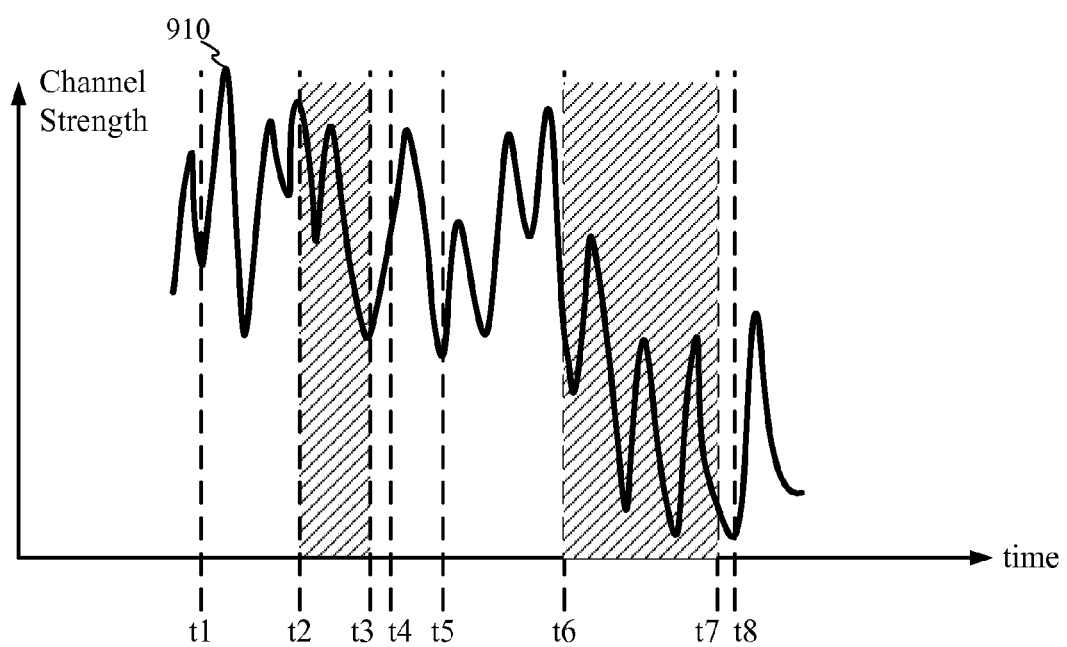
FIG. 9 illustrates channel strength (or SINR) for a high Doppler case in accordance with certain aspects of the disclosure.

FIG. 9 illustrates channel strength (e.g., SINR) for a high Doppler case in accordance with certain aspects of the disclosure. The sinusoidal curve 910 represents channel fading over time.

In certain aspects, when Doppler is high, the instantaneous CQI report may become stale by the time downlink scheduling occurs. As shown by the first LTE suspension region between t2 and t3 in FIG. 9, the instantaneous channel state at t3 will not reliably reflect the channel state at t4. In this case, the averaged information obtained during t1-t2 before LTE may provide a better estimate of the CQI state. This applies to the last row of Table 1 except the very last field. As may be seen from the last row of Table-1 (except last field), if the Doppler estimate is greater than or equals a higher threshold for the Doppler estimate ($TH_{Doppler\_HIGH}$), the UE resumes the CQI filter state from before LTE tune-away, after tuning back to LTE.

In certain aspects, one exception needs to be made for the high Doppler case. As shown by the second instance of LTE tune-away in FIG. 9 between t6 and t7, when the suspension exceeds a time period (e.g., is really long), the propagation environment or even the interference may change due to the fact that UE is moving fast for a long time period. In this scenario, all CQI information before LTE suspension (which is from t5-t6) may become stale and therefore a fresh CQI calculation must be started. This explains the last field of the table when the UE resets the CQI calculation for suspended duration value higher than or equal to the upper threshold for the suspension time ($Th_{ST\_HIGH}$).

In certain aspects, as may be seen from the middle row of Table-1, when the value of the Doppler is between the lower threshold for the Doppler estimate ($TH_{Doppler\_LOW}$) and the upper threshold for the Doppler estimate ($TH_{Doppler\_HIGH}$), the UE may choose to reset or resume the CQI calculation (e.g., the reset/resume value may be configured based on network and/or UE parameters).

Figure 10:
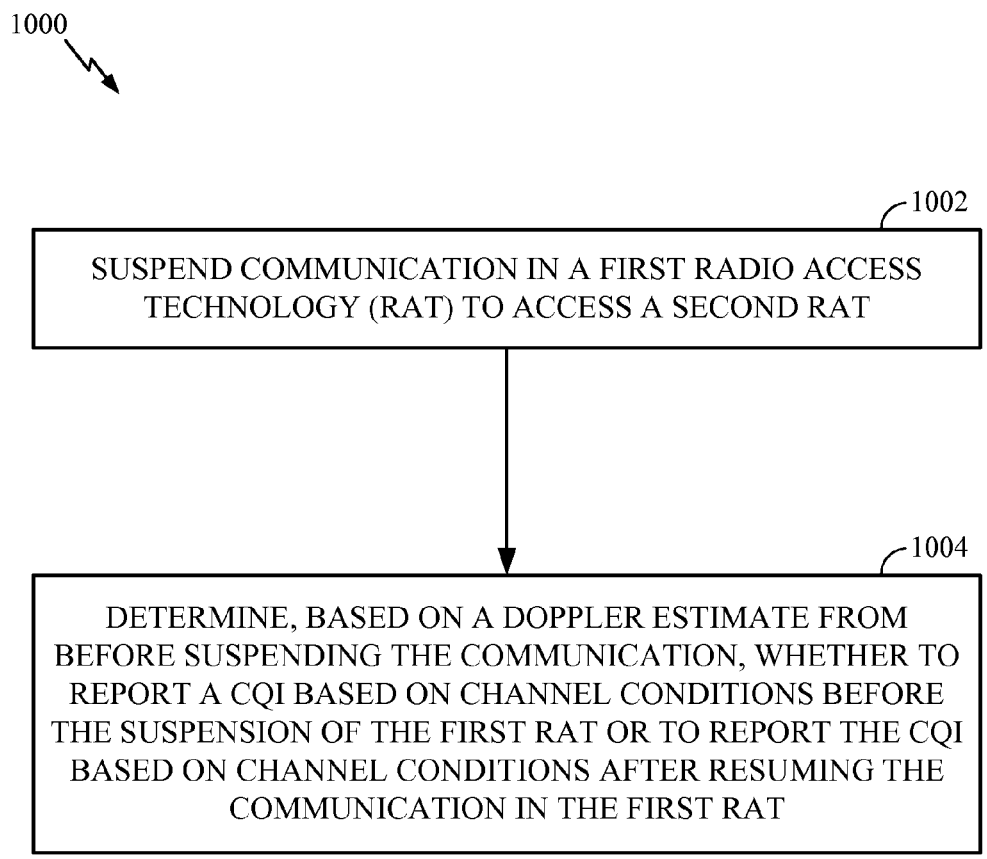
FIG. 10 illustrates example operations performed by a user equipment for determining how to perform CQI calculation/update after resuming LTE operation in accordance with certain aspects of the present disclosure.

FIG. 10 illustrates example operations 1000 performed by a user equipment for determining how to perform CQI calculation/update on resuming LTE operation after a temporary LTE suspension, in accordance with certain aspects of the present disclosure.

Operations 1000 may begin, at 1002, by suspending communication in a first radio access technology (RAT) to access a second RAT. AT 1004, the UE may determine, based on a Doppler estimate from before suspending the communication in the first RAT, whether to report a CQI based on channel conditions before the suspension of the first RAT or to report the CQI based on channel conditions after resuming the communication in the first RAT. In an aspect, the first RAT may include 3GPP LTE.

In certain aspects, the determining may include determining, based on the Doppler estimate from before suspending the communication and a time duration of suspension of the first RAT, whether to report the CQI based on the channel conditions before the suspension of the first RAT or to report the CQI based on the channel conditions after resuming the communication in the first RAT.

In certain aspects, reporting the CQI based on the channel conditions before the suspension of the first RAT comprises determining the CQI averaged over a period of time before suspending the communication in the first RAT.

In certain aspects, reporting the CQI based on the channel conditions after resuming the communication in the first RAT comprises determining the CQI at a substantially instantaneous point in time after resuming the communication in the first RAT. In alternative aspects, reporting the CQI based on the channel conditions after resuming the communication in the first RAT comprises determining the CQI averaged over a period of time, the period of time being different than that employed to determine a CQI average prior to suspending communication.

In certain aspects, the UE may report the CQI based on a value of the Doppler estimate, a value of a time duration of suspension, or a combination thereof. In an aspect, the values of the Doppler estimate and the time duration of suspension may be set based at least on the time duration of suspension of the first RAT, a time taken for the UE to receive resource scheduling information after reporting the CQI, or a combination thereof.

In certain aspects, the UE may compare the Doppler estimate to at least one of a lower threshold for the Doppler estimate ($TH_{Doppler\_LOW}$) or an upper threshold for the Doppler estimate ($TH_{Doppler\_HIGH}$), and may update a CQI filter state after resuming the communication in the first RAT to be different than the CQI filter state employed before suspending communication, if the value of the Doppler estimate is less than $TH_{Doppler\_LOW}$. In an aspect, updating the CQI filter state may include determining a CQI at a substantially instantaneous point in time after resuming the communication in the first RAT or determining a CQI averaged over a period of time, the period of time being different than that employed to determine a CQI average prior to suspending communication.

In certain aspects, the UE may compare the value of the time duration of suspension of the first RAT to one or more thresholds for the suspension time. This may include comparing the value of the time duration of suspension of the first RAT to at least one of a lower threshold for the suspension time ($Th_{ST\_LOW}$), a middle threshold for the suspension time ($Th_{ST\_MID}$) or an upper threshold for the suspension time ($Th_{ST\_HIGH}$). In an aspect, the UE may update a CQI filter state after resuming the communication in the first RAT, if the value of the time duration of suspension is greater than an upper threshold for the suspension time ($Th_{ST\_HIGH}$).

In certain aspects, the UE may employ a same CQI filter state as that employed before suspending communication of the first RAT, if the value of the Doppler estimate is greater than an upper threshold for the suspension time ($TH_{Doppler\_HIGH}$) and the value of the time duration of suspension is less than an upper threshold for the suspension time ($Th_{ST\_HIGH}$). In this aspect, the UE may determine a CQI averaged over a period of time before suspending the communication in the first RAT.

Figure 11:
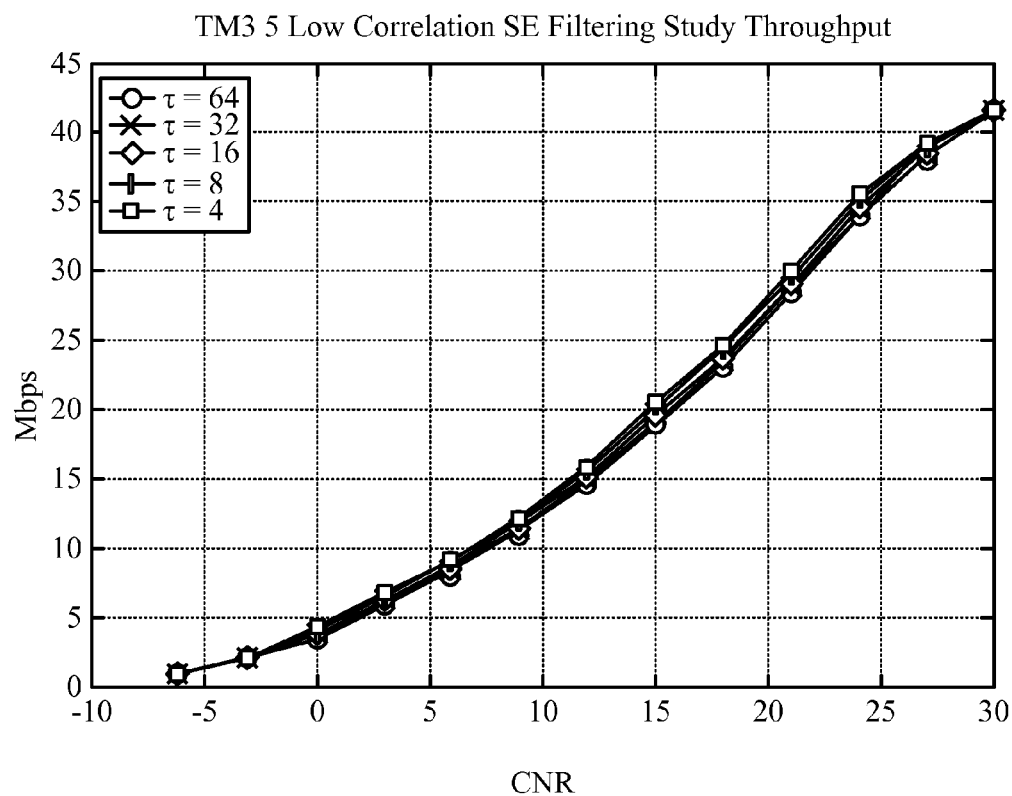
FIG. 11 illustrates example throughput performance under Extended Pedestrian A (EPA) 5 (low Doppler case) with different IIR filtering time constants for CQI in accordance with certain aspects of the present disclosure.

FIG. 11 illustrates example throughput performance under Extended Pedestrian A (EPA) 5 (low Doppler case) with different IIR filtering time constants for CQI, in accordance with certain aspects of the present disclosure. As shown in the legend of FIG. 11, the parameter tau (τ) denotes the time constant of the CQI spectral efficiency (CQI-SE) filtering in time domain. In certain aspects a larger value of tau implies more time-domain averaging (e.g., of a CQI). As may be observed from FIG. 11, for low Doppler case, it is beneficial to use less CQI averaging. In other words, it is beneficial to reset CQI calculation after tuning back in to LTE in this case.

Figure 12:
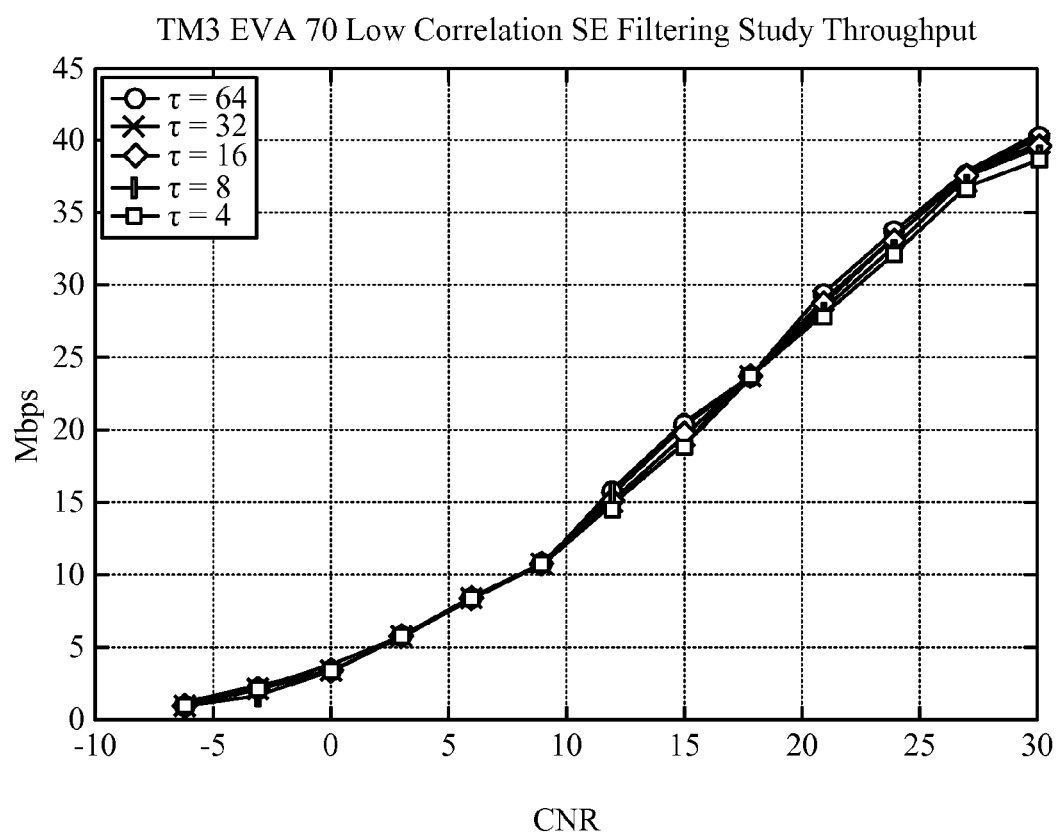
FIG. 12 illustrates example throughput performance under EVA70 channel (high Doppler case) with different averaging of CQI in accordance with certain aspects of the present disclosure

FIG. 12 illustrates example throughput performance under EVA70 channel (high Doppler case) with different averaging of CQI in accordance with certain aspects of the present disclosure. As may be observed from FIG. 12, for the high Doppler case, it is beneficial to use more CQI averaging upon LTE resumption. In other words, it is beneficial make use of the average CQI information before LTE suspension in this case.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Aspects describing determining how to perform LTE CQI calculation/update after tuning back to LTE based on Doppler estimate and possibly a time duration of suspension of the first RAT are described above. However, the present methods and apparatus include determining how to perform different operations after tuning back to LTE based on information from before suspending the communication. For example, the different operations include Doppler estimation, channel estimation, automatic gain control, frequency tracking loop, DC estimation, SNR estimation and/or time tracking loop. In aspects, one or more threshold values may be defined for the information similar to that described above for Doppler estimate and/or the time duration of LTE tune away. Further, the UE behavior regarding the operation after LTE resumption may be based on whether an information threshold and/or suspension time threshold is met similar to that described above for Doppler estimate.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of wireless communication performed by a user equipment (UE), comprising:
    suspending communication in a first radio access technology (RAT) to access a second RAT; and
    determining, based on a Doppler estimate from before suspending the communication, whether to report a Channel Quality Indicator (CQI) based on channel conditions before the suspension of the first RAT or to report the CQI based on channel conditions after resuming the communication in the first RAT.

2. The method of claim 1, wherein the determining comprises:
    determining, based on the Doppler estimate from before suspending the communication and a time duration of suspension of the first RAT, whether to report the CQI based on the channel conditions before the suspension of the first RAT or to report the CQI based on the channel conditions after resuming the communication in the first RAT.

3. The method of claim 1, further comprising reporting the CQI based on the channel conditions before the suspension of the first RAT.

4. The method of claim 3, wherein reporting the CQI based on the channel conditions before the suspension of the first RAT comprises determining the CQI averaged over a period of time before suspending the communication in the first RAT.

5. The method of claim 1, further comprising reporting the CQI based on the channel conditions after resuming the communication in the first RAT.

6. The method of claim 5, wherein reporting the CQI based on the channel conditions after resuming the communication in the first RAT comprises determining the CQI at a point in time after resuming the communication in the first RAT.

7. The method of claim 5, wherein reporting the CQI based on the channel conditions after resuming the communication in the first RAT comprises determining the CQI averaged over a period of time, the period of time being different than that employed to determine a CQI average prior to suspending communication.

8. The method of claim 1, further comprising reporting the CQI based on a value of the Doppler estimate, a value of a time duration of suspension, or a combination thereof.

9. The method of claim 8, wherein the values of the Doppler estimate and the time duration of suspension are set based at least on the time duration of suspension of the first RAT, a time taken for the UE to receive resource scheduling information after reporting the CQI, or a combination thereof.

10. The method of claim 1, wherein the determining, based on the Doppler estimate, comprises comparing the Doppler estimate to at least one of a lower threshold for the Doppler estimate ($TH_{Doppler\_LOW}$) or an upper threshold for the Doppler estimate ($TH_{Doppler\_HIGH}$).

11. The method of claim 10, further comprising reporting the CQI based on the channel conditions after resuming the communication in the first RAT.

12. The method of claim 11, wherein reporting the CQI based on the channel conditions after resuming the communication in the first RAT comprises updating a CQI filter state after resuming the communication in the first RAT to be different than the CQI filter state employed before suspending communication, if the value of the Doppler estimate is less than ($TH_{Doppler\_LOW}$).

13. The method of claim 12, wherein updating the CQI filter state comprises determining a CQI at a point in time after resuming the communication in the first RAT or determining a CQI averaged over a period of time, the period of time being different than that employed to determine a CQI average prior to suspending communication.

14. The method of claim 2, wherein determining, based on a Doppler estimate, comprises comparing the Doppler estimate to at least one of a lower threshold for the Doppler estimate ($TH_{Doppler\_LOW}$) or an upper threshold for the Doppler estimate ($TH_{Doppler\_HIGH}$).

15. The method of claim 14, wherein the determining further comprises comparing the value of the time duration of suspension of the first RAT to one or more thresholds for the suspension time.

16. The method of claim 15, wherein comparing the value of the time duration of suspension of the first RAT to one or more thresholds for the suspension time comprises comparing the value of the time duration of suspension of the first RAT to at least one of a lower threshold for the suspension time ($Th_{ST\_LOW}$), a middle threshold for the suspension time ($Th_{ST\_MID}$) or an upper threshold for the suspension time ($Th_{ST\_HIGH}$).

17. The method of claim 15, further comprising reporting the CQI based on the channel conditions after resuming the communication in the first RAT.

18. The method of claim 17, wherein reporting the CQI based on the channel conditions after resuming the communication in the first RAT comprises updating a CQI filter state after resuming the communication in the first RAT, if the value of the time duration of suspension is greater than an upper threshold for the suspension time ($Th_{ST\_HIGH}$).

19. The method of claim 15, further comprising reporting the CQI based on the channel conditions prior to suspending communication in the first RAT.

20. The method of claim 19, wherein reporting the CQI based on the channel conditions prior to suspending communication in the first RAT comprises employing a same CQI filter state as that employed before suspending communication of the first RAT, if the value of the Doppler estimate is greater than an upper threshold for the suspension time ($TH_{Doppler\_HIGH}$) and the value of the time duration of suspension is less than an upper threshold for the suspension time ($Th_{ST\_HIGH}$).

21. The method of claim 20, wherein employing the same CQI filter state as that employed before suspending communication of the first RAT comprises determining a CQI averaged over a period of time before suspending the communication in the first RAT.

22. The method of claim 1, wherein the first RAT comprises $3^{rd}$ Generation Partnership Project (3GPP) Long Term Evolution (LTE).

23. An apparatus of wireless communication performed by a user equipment (UE), comprising:
means for suspending communication in a first radio access technology (RAT) to access a second RAT; and
means for determining, based on a Doppler estimate from before suspending the communication, whether to report a Channel Quality Indicator (CQI) based on channel conditions before the suspension of the first RAT or to report the CQI based on channel conditions after resuming the communication in the first RAT.

24. The apparatus of claim 23, wherein the means for determining is configured to:
determine, based on the Doppler estimate from before suspending the communication and a time duration of suspension of the first RAT, whether to report the CQI based on the channel conditions before the suspension of the first RAT or to report the CQI based on the channel conditions after resuming the communication in the first RAT.

25. The apparatus of claim 23, further comprising:
means for reporting the CQI based on the channel conditions before the suspension of the first RAT.

26. The apparatus of claim 25, wherein the means for reporting the CQI based on the channel conditions before the suspension of the first RAT is configured to determine the CQI averaged over a period of time before suspending the communication in the first RAT.

27. The apparatus of claim 23, further comprising:
means for reporting the CQI based on the channel conditions after resuming the communication in the first RAT.

28. The apparatus of claim 27, wherein the means for reporting the CQI based on the channel conditions after resuming the communication in the first RAT is configured to determine the CQI at a point in time after resuming the communication in the first RAT.

29. The apparatus of claim 27, wherein the means for reporting the CQI based on the channel conditions after resuming the communication in the first RAT is configured to determine the CQI averaged over a period of time, the period of time being different than that employed to determine a CQI average prior to suspending communication.

30. The apparatus of claim 23, further comprising:
means for reporting the CQI based on a value of the Doppler estimate, a value of a time duration of suspension, or a combination thereof.

31. The apparatus of claim 30, wherein the values of the Doppler estimate and the time duration of suspension are set based at least on the time duration of suspension of the first RAT, a time taken for the UE to receive resource scheduling information after reporting the CQI, or a combination thereof.

32. The apparatus of claim 23, wherein the means for determining, based on the Doppler estimate, is configured to compare the Doppler estimate to at least one of a lower threshold for the Doppler estimate ($TH_{Doppler\_LOW}$) or an upper threshold for the Doppler estimate ($TH_{Doppler\_HIGH}$).

33. The apparatus of claim 32, further comprising:
means for reporting the CQI based on the channel conditions after resuming the communication in the first RAT.

34. The apparatus of claim 33, wherein the means for reporting the CQI based on the channel conditions after resuming the communication in the first RAT is configured to update a CQI filter state after resuming the communication in the first RAT to be different than the CQI filter state employed before suspending communication, if the value of the Doppler estimate is less than ($TH_{Doppler\_LOW}$).

35. The apparatus of claim 34, wherein updating the CQI filter state comprises determining a CQI at a point in time after resuming the communication in the first RAT or determining a CQI averaged over a period of time, the period of time being different than that employed to determine a CQI average prior to suspending communication.

36. The apparatus of claim 24, wherein the means for determining, based on a Doppler estimate, is configured to compare the Doppler estimate to at least one of a lower threshold for the Doppler estimate ($TH_{Doppler\_LOW}$) or an upper threshold for the Doppler estimate ($TH_{Doppler\_HIGH}$).

37. The apparatus of claim 36, wherein the means for determining is further configured to compare the value of the time duration of suspension of the first RAT to one or more thresholds for the suspension time.

38. The apparatus of claim 37, wherein comparing the value of the time duration of suspension of the first RAT to one or more thresholds for the suspension time comprises comparing the value of the time duration of suspension of the first RAT to at least one of a lower threshold for the suspension time ($Th_{ST\_LOW}$), a middle threshold for the suspension time ($Th_{ST\_MID}$) or an upper threshold for the suspension time ($Th_{ST\_HIGH}$).

39. The apparatus of claim 37, further comprising:
means for reporting the CQI based on the channel conditions after resuming the communication in the first RAT.

40. The apparatus of claim 39, wherein the means for reporting the CQI based on the channel conditions after resuming the communication in the first RAT is configured to update a CQI filter state after resuming the communication in the first RAT, if the value of the time duration of suspension is greater than an upper threshold for the suspension time ($Th_{ST\_HIGH}$).

41. The apparatus of claim 37, further comprising:
means for reporting the CQI based on the channel conditions prior to suspending communication in the first RAT.

42. The apparatus of claim 41, wherein the means for reporting the CQI based on the channel conditions prior to suspending communication in the first RAT is configured to employ a same CQI filter state as that employed before suspending communication of the first RAT, if the value of the Doppler estimate is greater than an upper threshold for the suspension time ($TH_{Doppler\_HIGH}$) and the value of the time duration of suspension is less than an upper threshold for the suspension time ($Th_{ST\_HIGH}$).

43. The apparatus of claim 42, wherein employing the same CQI filter state as that employed before suspending communication of the first RAT comprises determining a CQI averaged over a period of time before suspending the communication in the first RAT.

44. The apparatus of claim 23, wherein the first RAT comprises $3^{rd}$ Generation Partnership Project (3GPP) Long Term Evolution (LTE).

45. An apparatus for wireless communication performed by a user equipment (UE), comprising:
at least one processor configured to:
suspend communication in a first radio access technology (RAT) to access a second RAT; and
determine, based on a Doppler estimate from before suspending the communication, whether to report a Channel Quality Indicator (CQI) based on channel conditions before the suspension of the first RAT or to report the CQI based on channel conditions after resuming the communication in the first RAT; and
a memory coupled to the at least one processor.

46. A computer program product for wireless communication performed by a user equipment (UE), comprising:
a computer-readable medium comprising code for:
suspending communication in a first radio access technology (RAT) to access a second RAT; and
determining, based on a Doppler estimate from before suspending the communication, whether to report a Channel Quality Indicator (CQI) based on channel conditions before the suspension of the first RAT or to report the CQI based on channel conditions after resuming the communication in the first RAT.

47. A method of wireless communication performed by a user equipment (UE), comprising:
suspending communication in a first radio access technology (RAT) to access a second RAT; and
determining, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

48. The method of claim 47, wherein determining comprises determining, based on information obtained from before suspending the communication and a time duration of suspension of the first RAT, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

49. An apparatus of wireless communication performed by a user equipment (UE), comprising:
means for suspending communication in a first radio access technology (RAT) to access a second RAT; and
means for determining, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

50. The apparatus of claim 49, wherein the means for determining is configured to:
determine, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

51. An apparatus for wireless communication performed by a user equipment (UE), comprising:
at least one processor configured to:
suspend communication in a first radio access technology (RAT) to access a second RAT; and determine, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT; and a memory coupled to the at least one processor.

52. A computer program product for wireless communication performed by a user equipment (UE), comprising:

a computer-readable medium comprising code for:

suspending communication in a first radio access technology (RAT) to access a second RAT; and determining, based on information obtained from before suspending the communication, whether to determine at least one of Doppler estimation, channel estimation, automatic gain control, frequency tracking loop, DC estimation, SNR estimation or time tracking loop based on the information obtained before the suspension of the first RAT or to determine the at least one of Doppler estimation, channel estimation, automatic gain control, frequency tracking loop, DC estimation, SNR estimation or time tracking loop based on information obtained after resuming the communication in the first RAT.

\* \* \* \* \*